March 5, 1940. C. A. SCHAEFER 2,192,276
APPARATUS FOR TEMPERATURE CONTROL
Original Filed May 22, 1936 7 Sheets-Sheet 1
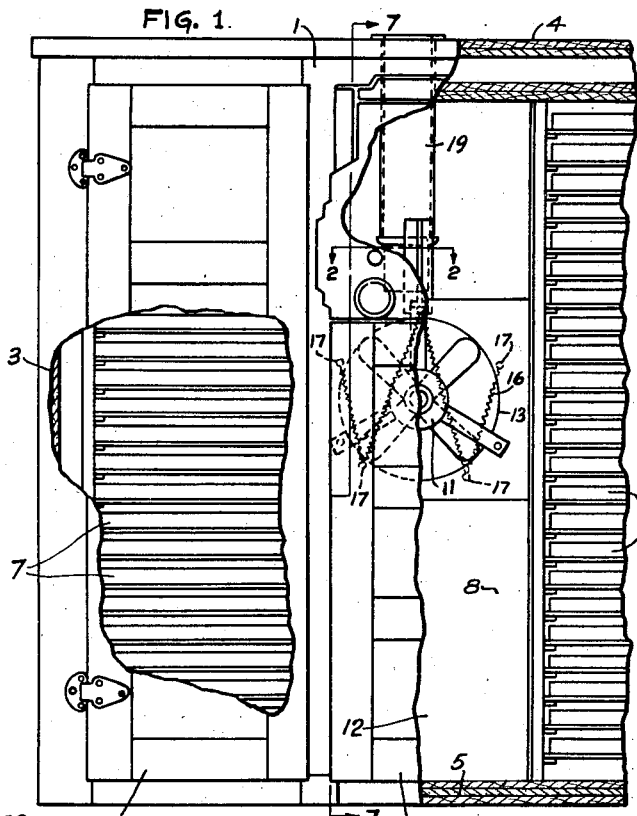
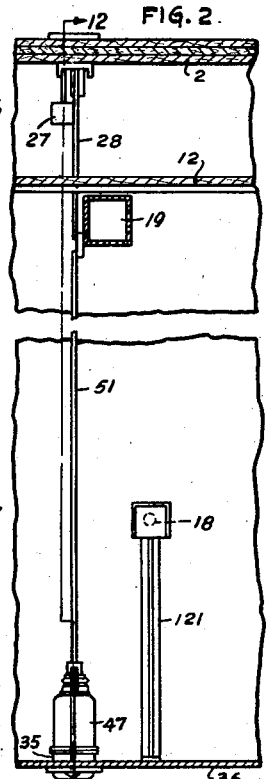
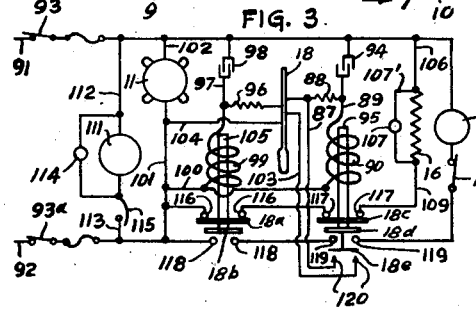
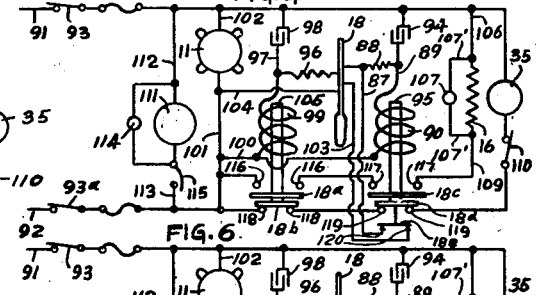
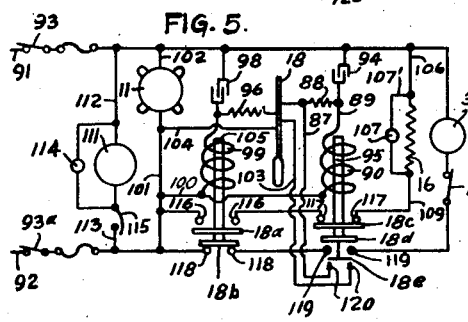
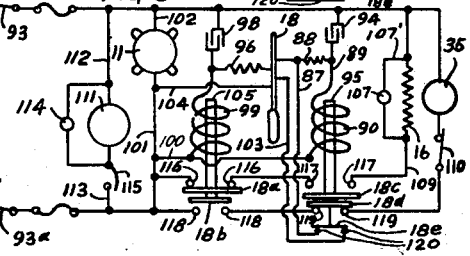
INVENTOR.
CARL A. SCHAEFER,
BY
ATTORNEYS.

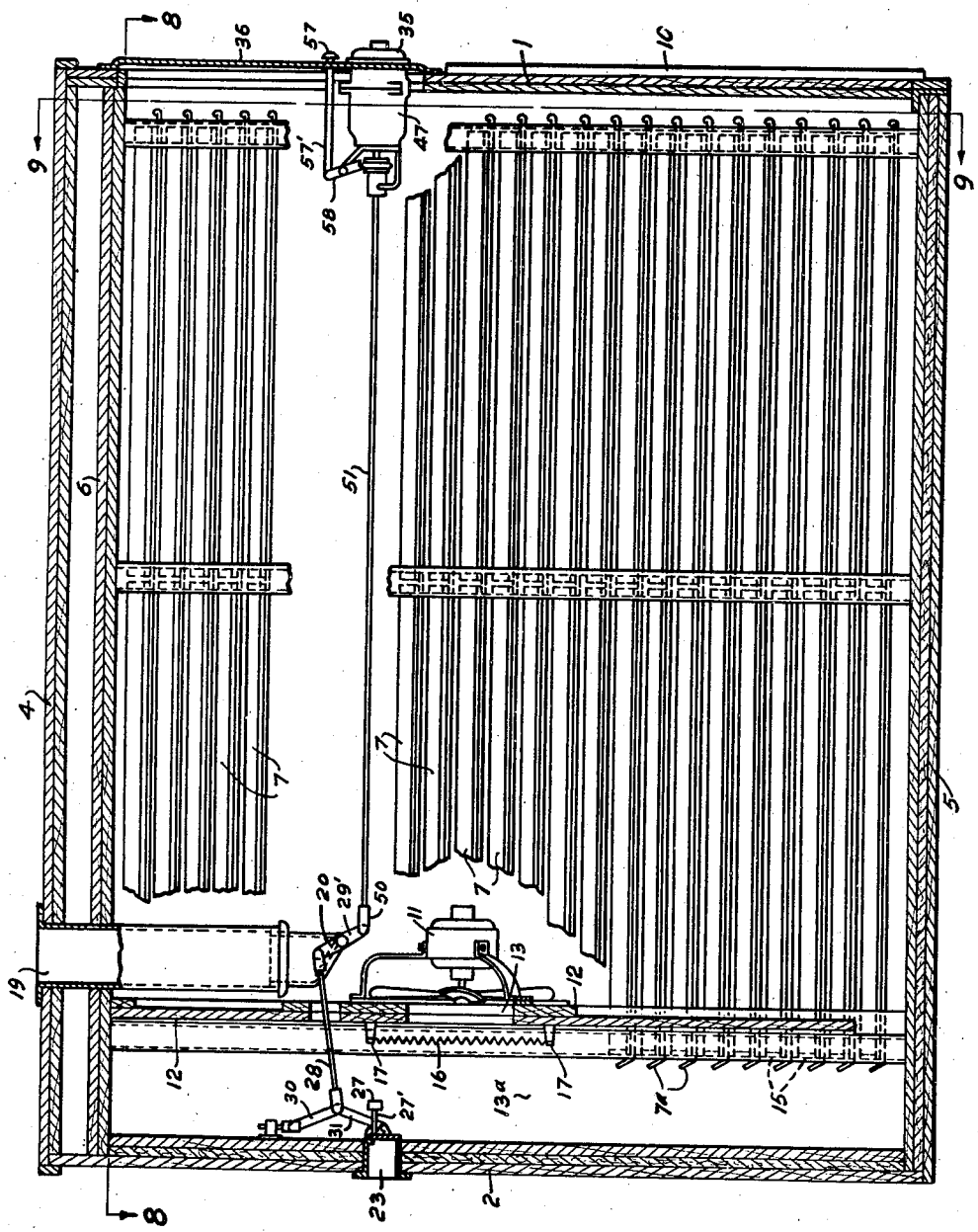

March 5, 1940.   C. A. SCHAEFER   2,192,276
APPARATUS FOR TEMPERATURE CONTROL
Original Filed May 22, 1936    7 Sheets-Sheet 3

INVENTOR.
CARL A. SCHAEFER,
BY
ATTORNEYS.

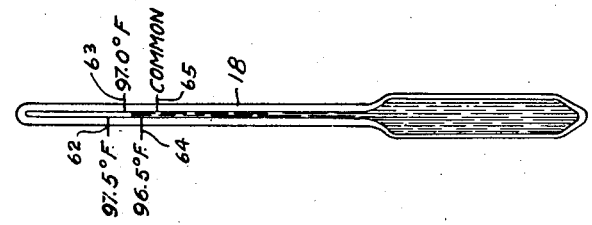
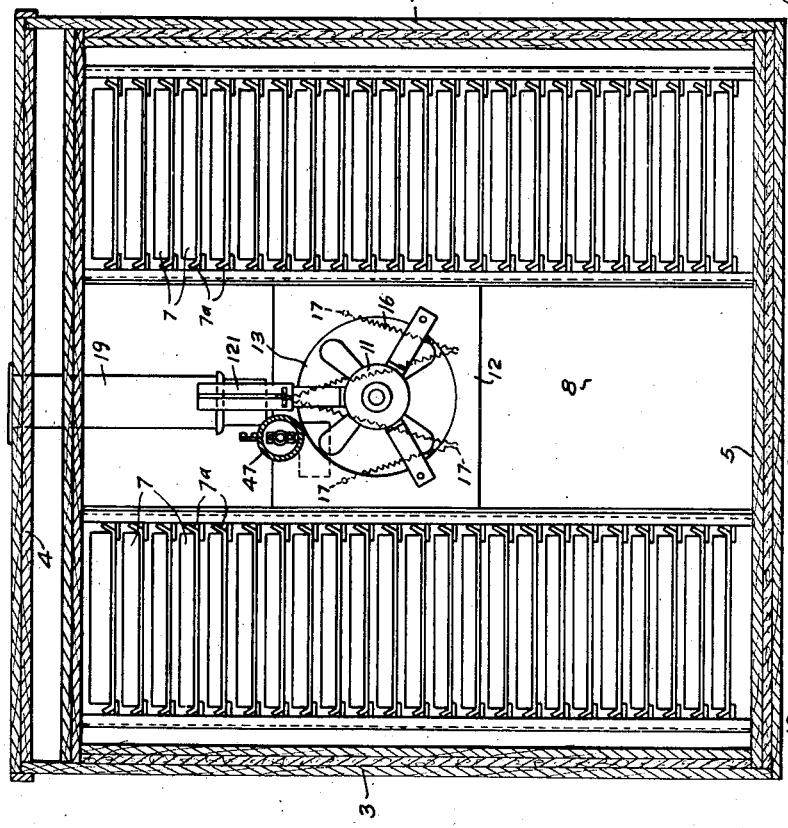

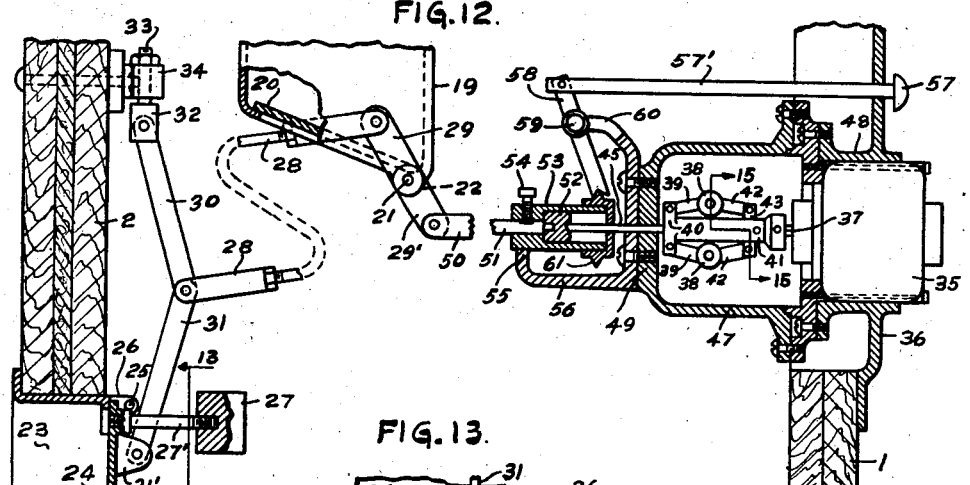

March 5, 1940. C. A. SCHAEFER 2,192,276
APPARATUS FOR TEMPERATURE CONTROL
Original Filed May 22, 1936  7 Sheets-Sheet 6
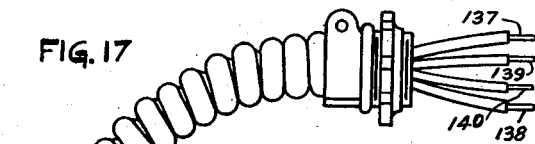
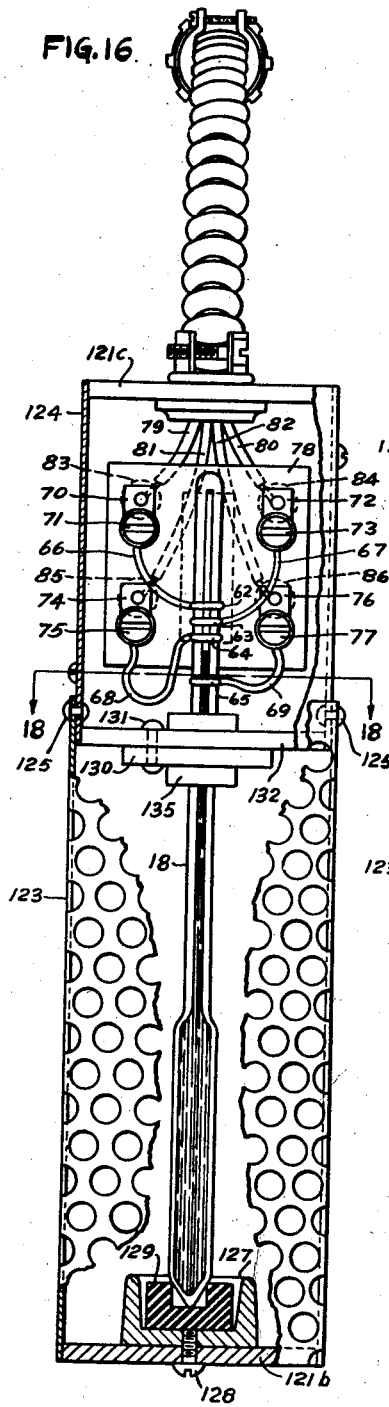
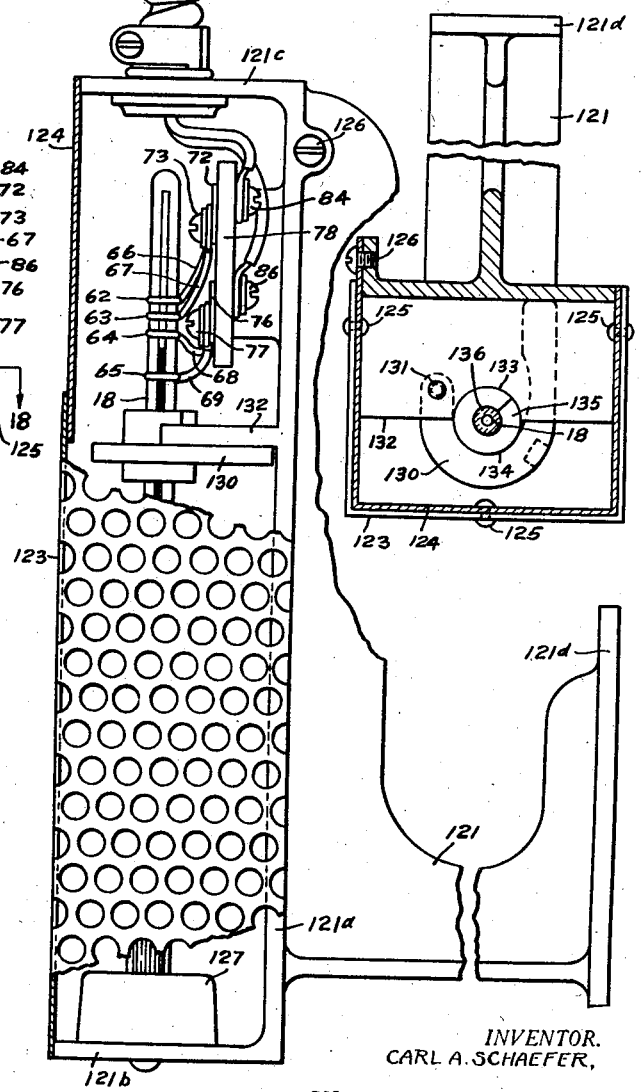
INVENTOR.
CARL A. SCHAEFER,
BY
ATTORNEYS.

March 5, 1940.  C. A. SCHAEFER  2,192,276
APPARATUS FOR TEMPERATURE CONTROL
Original Filed May 22, 1936  7 Sheets-Sheet 7
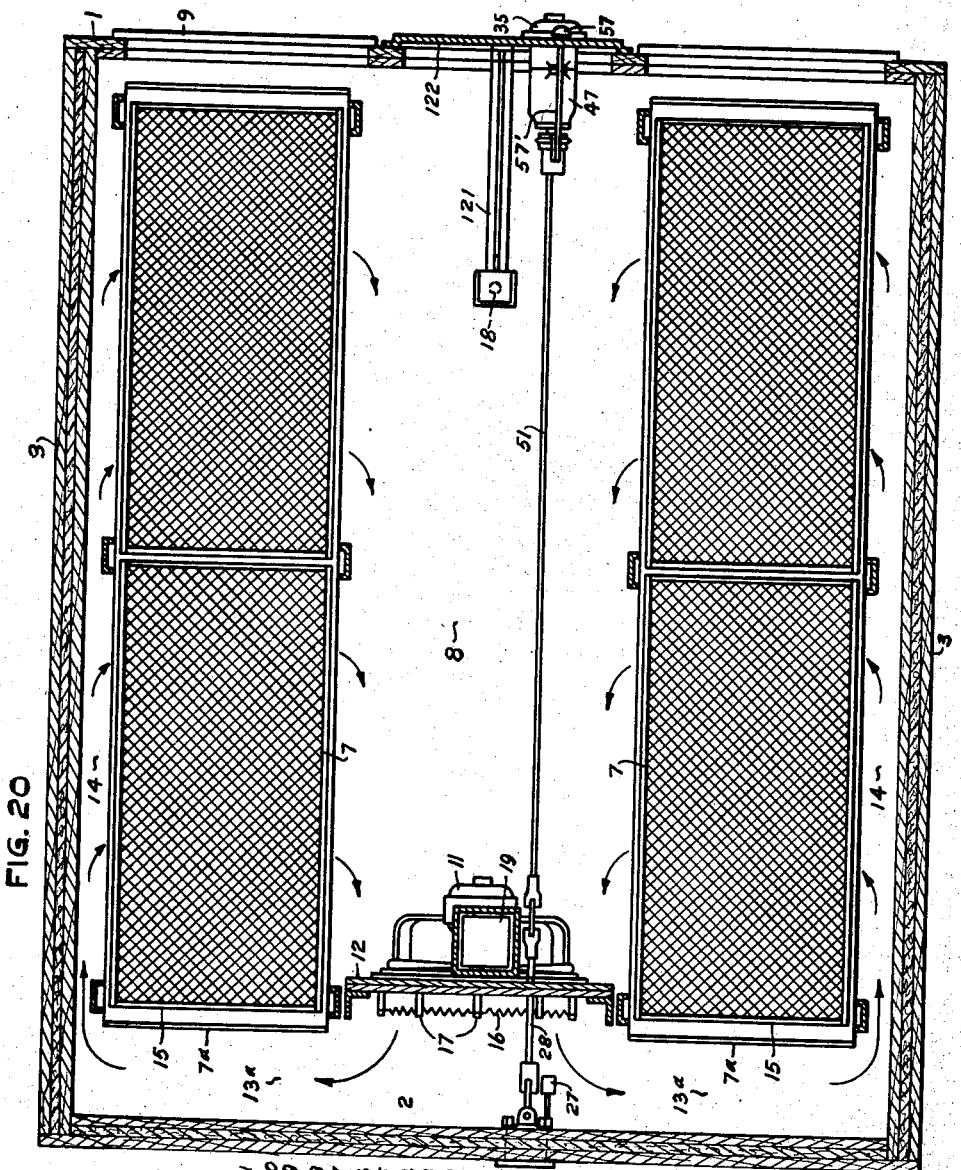
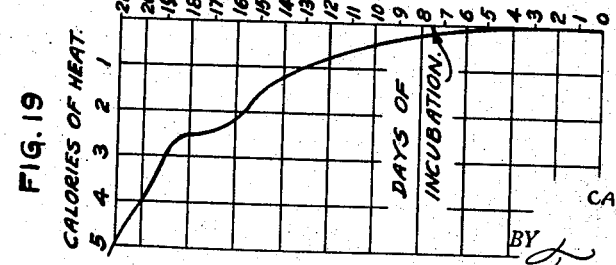
INVENTOR.
CARL A. SCHAEFER,
BY
ATTORNEYS.

Patented Mar. 5, 1940

2,192,276

UNITED STATES PATENT OFFICE 2,192,276

APPARATUS FOR TEMPERATURE CONTROL

Carl A. Schaefer, Detroit, Mich.

Original application May 22, 1936, Serial No. 81,160. Divided and this application December 5, 1936, Serial No. 114,415

23 Claims. (Cl. 236—3)

This invention relates to means for maintaining a uniform condition and more particularly to means for maintaining a uniform temperature, one application of which may be in an incubator and separate hatcher for eggs and in this latter respect the invention constitutes an improvement over the method and means set forth in U. S. Letters Patent 1,968,355 issued July 31, 1934, on an application filed by me.

One object of the invention is a method which comprises controlling the temperature of an incubator or the like by the application of artificial heat or of cooling air or other cooling medium as required, by a single thermostatic means.

Another object of the invention is a method of operating an incubator and a hatcher by placing eggs in the incubator, controlling the temperature therein by supplying artificial heat and admitting outside air as needed, controlling the supply of artificial heat and the admission of outside air therein by a single thermostatic means, moving the eggs to a hatcher from the incubator after a predetermined length of time, and controlling the supply of artificial heat and the admission of outside air to the hatcher by a single thermostatic means therein.

Another object of the invention is a regulator for maintaining a uniform condition, including oppositely acting devices for affecting the condition and a movable means which in spaced positions selects one of said devices for action and which in an intermediate position or positions controls the application of the selected device.

Another object of the invention is a temperature regulator including heating means and cooling means and an element movable in response to temperature for selecting one of said means for operation and for controlling the selected means.

Another object of the invention is a thermostatic control system involving a contact element movable in response to temperature and cooperating with spaced contacts corresponding to opposite extreme temperature conditions to select either heating means or cooling means for operation as required by the temperature condition and cooperating with at least one contact element corresponding to the temperature condition desired, to control the application of a selected means.

Other objects and features of the invention will be readily apparent to those skilled in the art from the following specification and the accompanying drawings illustrating certain preferred embodiments of the invention. This application is a division of my application Serial No. 81,160, filed May 22, 1936, and reference is herein, also, made to copending application Serial No. 114,414 filed December 5, 1936, also a division of application Serial No. 81,160 and in which is claimed a method of temperature control herein described and illustrated.

Fig. 1 is a partial front elevation, partly in transverse section, of an incubator or hatcher.

Fig. 2 is a fragmentary horizontal section on the line 2—2 of Fig. 1.

Figure 8:
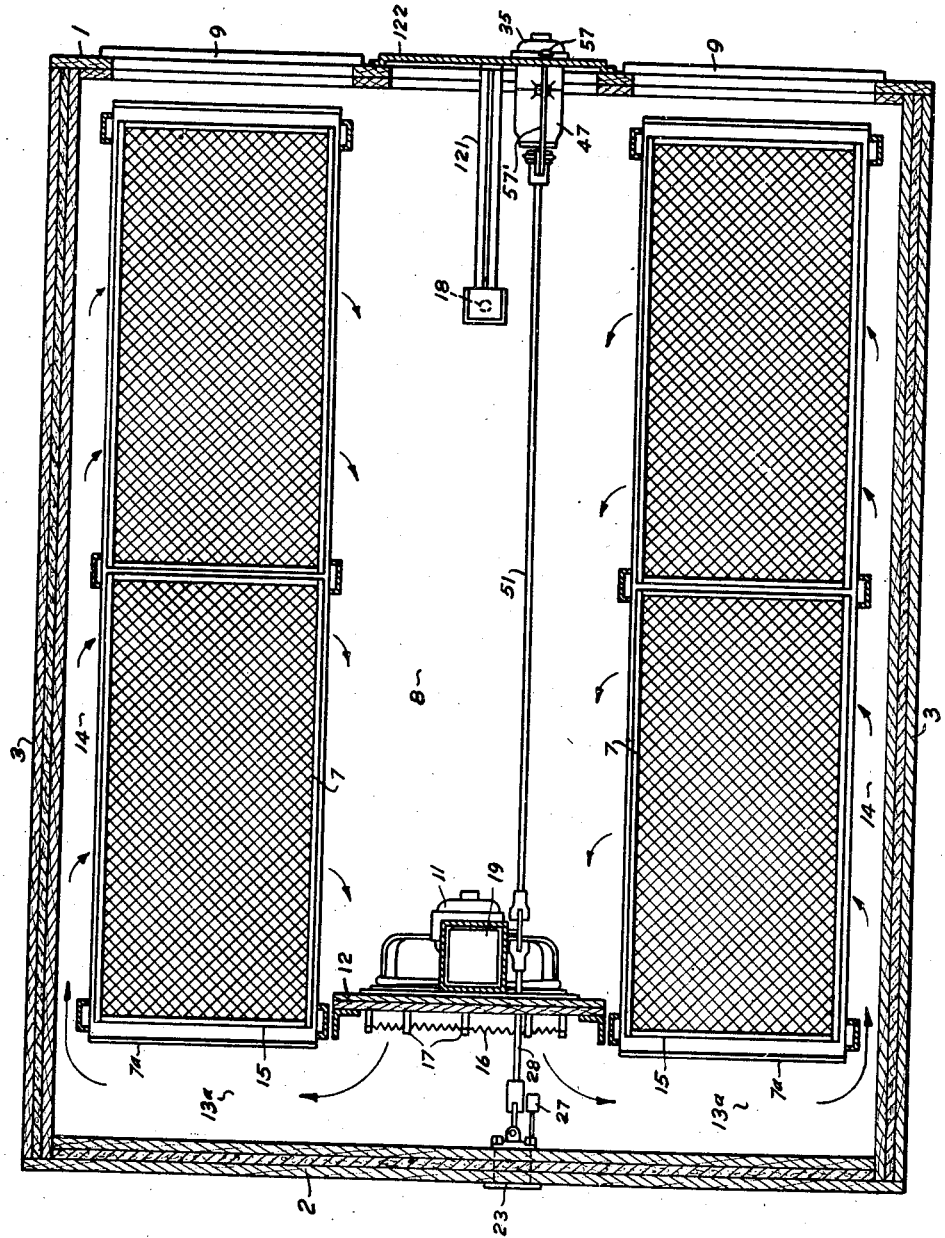

Figs. 3, 4, 5, and 6 are electrical wiring diagrams in different stages of operation, showing the manner of controlling the temperature conditions by electrically operated means.

Fig. 7 is an enlarged longitudinal section on the line 7—7 of Fig. 1.

Fig. 8 is a horizontal section on the line 2—3 of Fig. 7.

Fig. 9 is a vertical section on the line 9—9 of Fig. 7.

Fig. 10 is an elevation of the thermostat, there being one in the incubator and one in the hatcher.

Fig. 11 is a diagrammatic view showing the operating ranges of the thermostat in the incubator and hatcher for controlling the heater and the air supply.

Fig. 12 is an enlarged fragmentary longitudinal section of some of the details of the mechanism as seen on the line 12—12 of Fig. 2.

Fig. 13 is a fragmentary transverse section on the line 13—13 of Fig. 12.

Fig. 14 is a view similar to Fig. 12, but with the parts in a different working position.

Fig. 15 is an enlarged fragmentary transverse section on the line 15—15 of Fig. 12.

Fig. 16 is a view of the thermostat and the leads connected thereto, with a portion of the casing enclosing the thermostat broken away.

Fig. 17 is a side elevation of the casing enclosing the thermostat partly broken away and of the supporting bracket for the casing.

Fig. 18 is a horizontal section on the line 18—18 of Fig. 16.

Fig. 19 is a heat chart showing the heat produced by the eggs as the incubation and hatching thereof advances.

Fig. 20 is a view of the hatcher similar to Fig. 8, the latter being a view of the incubator.

The incubator and hatcher are constructed alike as to the heater and air damper mechanism and as to the thermostat for controlling the supplying of artificial heat and the admission of outside air. Fig. 8 shows a horizontal section of the incubator and Fig. 20 shows a similar view of the hatcher. Similar reference numerals will be applied to like parts of the incubator and the hatcher. I will, therefore, describe the parts of the incubator only.

In the drawings, the front wall of the casing of the incubator is numbered 1, the rear wall 2, the side walls 3, the top 4 and the bottom or floor is numbered 5. An inside ceiling 6 is also employed to provide for heat insulation, and in the side and rear walls and in the floor a central sheet of insulating fiber is used for the same purpose.

Figs. 1, 7 and 9 show the egg trays 7, having the usual mesh bottoms. These egg trays are arranged in two tiers, one on each side, with a central corridor 8 between them. Doors 9 are provided to permit access to the spaces in which the egg trays are stacked, while the corridor 8 is accessible through the door 10.

Air is circulated over and through the egg trays preferably by an electric fan 11, supported in a vertical partition 12 at the rear of the corridor 8. This partition is spaced a short distance from the rear wall 2 and has the opening 13 through which passes the air from the fan, the fan being so mounted that the direction of circulation of air is toward the rear wall 2 from the corridor 8. The air currents from the fan divide and spread in all directions first entering the passages 13$^a$, and then entering the passages 14, as seen in Fig. 8. The air then passes from the passages 14 over and through the egg trays and returns to the corridor 8 and the fan 11. Preferably the air passes horizontally between the egg trays 7, but the present invention is not confined to this horizontal movement of the air, as the passageways could be arranged to direct the air so that it would pass vertically through the egg trays. When the air is passed horizontally between the egg trays, division plates 7$^a$ support the egg trays 7 and prevent vertical movement of the air through the tiers of egg trays. The arrows in Fig. 8 indicate the horizontal path of the air.

When the egg trays are in position, in the present embodiment, the ends 15 form a continuation of the baffle formed by the partition 12 at the rear of the corridor 8.

An electrical heating element 16, on the insulated studs 17, attached to the rear of the partition 12, supplies artificial heat, when needed, for the air circulated by the fan 11.

The fan 11 and heating element 16 receive electric current from a common source, the supply to the heating element being under the control of the thermostat 18, which actuates the switches 18$^a$, 18$^b$, 18$^c$, 18$^d$, 18$^e$. These switches are contacts, preferably of the mercury tube type, magnetically actuated by coils 98 and 99 and their respective armatures.

The thermostat 18 is located in the corridor 8 and will be described more in detail later. In the embodiment of the incubator illustrated in my Patent 1,968,355, it was necessary to employ two thermostats for the incubator or hatcher, whereas with the present invention it is necessary to employ but one thermostat in the incubator or hatcher. The thermostat 18 is preferably located in the corridor 8 and controls the position of the switches 18$^a$, 18$^b$, 18$^c$, 18$^d$, 18$^e$, which control the supply of artificial heat and the admission of outside air.

During the operation of the incubator and the hatcher, it is necessary to supply artificial heat at times and at other times it is necessary to admit outside air to cool the air therein, and at other times it is necessary to cut off the supply of artificial heat without admitting outside air, in order to maintain the temperature of the air within the desired range.

When the eggs are placed in the incubator, they are cool and do not give off any heat. At that time it is necessary to supply artificial heat. As the process of incubation progresses the eggs develop heat and as soon as this heat from the eggs raises the temperature of the air above the desired maximum, it is necessary to cut off the supply of artificial heat. If the temperature of the air continues to rise and reaches a predetermined point, it is necessary to admit cooling air from the outside to reduce the temperature.

When the eggs are removed from the incubator, shown in Figs. 1, 7, 8 and 9, for transfer to the hatcher, which is usually done at the end of seventeen or seventeen and one-half days, although it can be done at other times, the eggs are developing considerable animal heat, but in transferring them to the hatcher, shown in Fig. 20, they are cooled. It is then necessary to supply artificial heat in the hatcher to restore the eggs to the desired temperature, when the artificial heat is cut off and cooling air admitted as needed to maintain the eggs at the proper temperature. When outside air is admitted to the incubator and to the hatcher, some of the air therein is permitted to escape so that the outside air can enter.

Fig. 19 shows a heat graph which illustrates the heat developed by the eggs as the incubation and hatching progresses. A period of twenty-one days is illustrated, which is the customary period for incubating and hatching chicken eggs. The curved line indicates the heat units given off per egg per day. This is shown in calories (252 calories equal one B. t. u.) The numerals at the right of Fig. 19 indicate the days, while the numerals at the top of Fig. 19 indicate the calories of heat.

During the first four days the eggs give off no heat, but they absorb some heat during that period. After the fourth day, the eggs give off heat, which steadily increases until about the eighteenth day, when there is no increase for about a day. Then the increase in heat developed by the eggs is resumed on the nineteenth day and the increase is very rapid from that time on until the chickens are hatched.

The graph of Fig. 19 is the result of tests with calorimeters.

Staged incubation is usually practiced in the incubator, but not in the hatcher. Usually the incubator is only partially filled at the first setting. This is followed by the setting of other eggs in the incubator while the first eggs are still in it. In this way, the incubator will contain eggs in different stages of incubation. When the first setting reaches the proper stage of incubation these eggs are removed to the hatcher. In this way the incubator contains eggs which are not developing heat and also eggs which are developing heat.

The oldest eggs are removed from the incubator and transferred to the hatcher. This reduces the temperature in the incubator because the eggs removed are the hottest eggs and because the eggs added to the incubator when the hottest eggs are removed are cool and take in heat instead of giving off heat. When the eggs are removed from the incubator and placed in the hatcher, they are usually cooled during the transfer by the lower temperature and humidity of the room in which the incubator and hatcher are located. This is particularly the case when the eggs are candled for the purpose of removing the infertile eggs and those with dead germs. This candling is usually done at the time of the transfer of the eggs from the incubator to the hatcher. These eggs, therefore, generally require some reheating in the hatcher after being transferred thereto. The period of reheating in the hatcher after the eggs are transferred to it depends upon the quantity and temperature of the entering eggs and trays, and the temperature and humidity conditions in the room and in the hatcher at the time. As the hatching period progresses, the quantity of heat given off by the eggs and the hatching chicks usually becomes great enough to more than supply the heat required to maintain the desired temperature in the hatcher. When the temperature exceeds that which is desired in the hatcher, it becomes necessary to prevent the eggs and chicks from overheating, and this is done by a cooling medium which reduces the temperature in the hatcher.

Due to these variations in the heat conditions it is necessary to accurately control the temperature, by cutting off the artificial heat when necessary and to supply a cooling medium as needed.

In the embodiment illustrated in the drawings, outside air, as needed, is admitted through a duct 19, which extends downwardly from the top 4 of the fan 11, so that the fan 11 will draw in air through this duct when needed. A damper 20, Figs. 7, 12 and 14, is pivotally mounted on a shaft 21 rotatably supported in bosses 22 attached to the lower end of the duct 19. The hatcher is also provided with the same damper, although it is not illustrated in Fig. 20 showing a horizontal section of the hatcher. As before stated, however, the hatcher is of the same construction as the incubator and is provided with the same mechanism and operates in the same way as the incubator.

Air is discharged through an opening 23, located so that a part of the air which has passed over the eggs will be exhausted when air is admitted through the duct 19. A damper 24 closes the duct 23, and is pivotally mounted on a shaft 25 secured in bosses 26 attached to a damper frame 23'. This damper 24 is maintained in a normally closed position by a weight 27, which is secured to the damper by a stem 27'. As the dampers 20 and 24 are interconnected, as will be presently pointed out, the weight 27 acts on both of these dampers.

The dampers 20 and 24 are interconnected by an adjustable connection 28, so that they will open and close simultaneously. This connection 28 is pivotally secured to the upper end of a lever 29 secured to the shaft 21 of the damper 20. The opposite end of the connection 28 is pivotally secured to the central portion of a toggle lever arrangement consisting of the members 30 and 31. The member 30 is pivotally secured at its upper end to an adjustable block 32 having an upwardly extending screw-threaded stem 33 threaded into a member 34 attached to the inner side of the rear wall 2 above the damper opening 23. The lower end of the toggle member 31 is pivotally attached to an ear 31' on the damper 24. Through these connections the dampers 20 and 24 are moved simultaneously, so that both will open at the same time and both will close at the same time.

When the fan 11 is in operation, the simultaneous opening of the dampers 20 and 24, admits outside air through the duct 19, due to the action of the fan, and permits the discharge of air through the duct 23, due to the action of the fan, without interfering with the normal circulation of the greater portion of the air within the incubator and hatcher. When there is no necessity for the admission of outside air, both dampers 20 and 24 are closed.

The dampers are opened by an electric motor 35, mounted in a plate-like casting 36 forming a portion of the front wall 1, at the forward end of the corridor 8. The operation of this damper motor 35 is under the control of the thermostat 18, to open the dampers against the weight 27. The mechanism for opening the dampers 20 and 24, and maintaining them open when outside air is necessary to be admitted, is attached to the shaft 37, Figs. 12 and 14, of the motor 35. This mechanism is a fly-ball centrifugally affected device, power being derived from the action of a pair of oppositely positioned fly-balls 38, each of which is pivotally connected at the central portion of a toggle lever construction having the links 39 and 42. Each link 39 is pivotally secured to a pair of slotted radially extending ends 40 attached to the outer end of a sleeve-like member 41 secured to the shaft 37 of the motor 35. The links 42 are each pivotally connected at their outer ends to their respective fly-balls 38, and at their inner ends to the oppositely positioned, radially extending ends 43 of a cross-head member 44 (Figs. 12 and 14). This cross-head is secured by a pin to the inner end of a short rod 45 extending rearwardly through a central bore in the outer end of the sleeve member 41, in longitudinal alignment with the shaft 37 of the damper motor 35, and is mounted for reciprocal movement with respect to the sleeve 41 in a longitudinally extending slot 46 in the sleeve 41.

As the damper motor 35 rotates, the fly-balls 38 move outwardly and, through the toggle links 39 and 42, draw the cross-head 44 toward the outer end of the sleeve 41, causing the short end 45 to move rearwardly. The fly-ball mechanism is preferably enclosed in a housing 47 which is attached to a hollow boss 48 of the plate 36 in which is mounted the damper motor 35. The short shaft 45 is loosely supported for reciprocal movement in a central opening in the end portion 49 of the housing 47.

The damper mechanism just described, which is operated by the damper motor 35, opens the dampers 20 and 24 and holds them open, when the motor 35 rotates. When the motor 35 stops, the weight 27 closes the dampers.

The adjustable rod-end 50, having the rod 51 secured thereto, is pivoted to the lower end 29' of the lever 29 connected to the air inlet damper 20 by the shaft 21. A thrust block 52 is secured to the forward end of the rod 51 and in the center of its forward surface is a depression in which is seated the rear end of the short shaft 45. As the shaft 45 is moved rearwardly, it presses on the thrust block 52 and, through it, on the rod 51, causing the dampers 20 and 24 to move to the open position shown in Fig. 14. These dampers are held in open position as long as the damper motor 35 is operated, because the fly-balls are being continuously rotated and held in their outer position by centrifugal force.

The block 52 is enclosed in a tubular grease-retaining member 53 secured to the rod 51 by a set-screw 54. The member 53 is supported for reciprocal movement in the semi-circular seat of the saddle 55 at the rear of a bracket 56 attached to the housing 47. The button 57 is provided to indicate whether the dampers 20 and 24 are open or closed. This button is secured to the outer end of the bar 57' projecting through the front wall plate 36. The bar 57' is pivotally secured at its inner end to the upper end of a lever 58 pivoted at 59 on a bracket 60 at the rear end of the housing 47. The lever 58 is notched at its lower end to engage the annular rib 61 on the outer surface of the grease-retaining member 53. The button 57 is moved forwardly and rearwardly as the dampers 20 and 24 are opened and closed. The position of the button 57 in Fig. 12 indicates that the dampers 20 and 24 are closed, while the position of this button in Fig. 14 indicates that these dampers are open.

Figs. 3, 4, 5 and 6 diagrammatically illustrate the devices for controlling the temperature. The thermostat 18 is employed for controlling the circuit for the heater and the circuit for the damper motor 35 for operating the dampers 20 and 24. This thermostat controls the temperature within predetermined limits whether the air is subjected to artificial heat or to cooling air. This thermostat acts through two different ranges of temperature whose midway or average point is the same. The operation of this thermostat and its connections will be more fully described later.

The thermostat 18 has four contacts which are preferably permanently located at the factory so that they cannot be changed by the user. These contacts are numbered 62, 63, 64, 65. The contact 62 is located so that it will be engaged by the column of mercury in the thermostat 18 at 97.5° F., the contact 63 at 97° F., the contact 64 at 96.5° F. and the contact 65 is located at any convenient location below the contact 64. These temperatures are selected for purposes of illustration and may be varied, preferably at the factory, to meet various conditions, but the temperatures indicated are generally used. The contacts 62, 63, 64 and 65 have the short leads 66, 67, 68 and 69, respectively connected thereto. The lead 66 is secured to the terminal 70 by the screw 71. The lead 67 is secured to the terminal 72 by the screw 73. The lead 68 is secured to the terminal 74 by the screw 75 and the lead 69 is secured to the terminal 76 by the screw 77. The terminals 70, 72, 74, and 76 are mounted on one side of a block 78. By removing the screws 71, 73, 75 and 77 the short leads 66, 67, 68 and 69 can be disconnected from their terminals on the block 78, so that the thermostat 18 can be removed from its casing for purposes of renewal or for any other purpose. Other leads 79, 80, 81 and 82 are connected to the terminals 70, 72, 74 and 76, respectively by the screws 83, 84, 85 and 86 extending through the block 78 from the opposite side thereof.

The lead 79 secured to the terminal 70, is connected to the line 87 and through the resistor 88 to the line 89 and to solenoid 90. Power lines 91 and 92 are provided, in which is a two-pole switch 93, 93ª. The line 89 is connected through the condenser 94 to the power line 91. The core 95 of the solenoid 90 carries the switches 18ᶜ, 18ᵈ, 18ᵉ.

The lead 80, secured to the terminal 72, is connected, through a resistor 95, line 97, and a condenser 98, to the power line 91 and is also connected, through resistor 96, to the winding of the solenoid 99. The windings of both solenoids are connected to a line 100, which extends to a line 101 connecting the fan 11 to the power line 92, the fan being also connected by a line 102 to the power line 91. The fan 11 is always supplied with current, when the two pole switch 93, 93ª, is closed, so that there will always be a circulation of air when current is supplied through the power lines 91, 92.

The lead 81, secured to the terminal 74, is connected to a line 103. The lead 82, secured to the terminal 76, is connected to the line 101 by a line 104. The switch 18ᵉ and the lines 87 and 103 form an electrical interlock.

The core 105 of the solenoid 99 carries the switches 18ª and 18ᵇ. The switches 18ª and 18ᶜ are provided to open and close a heater circuit which extends from the power line 91, through a line 106, a heater 16 having a pilot light 107 in the line 107', a line 109 having gaps for the switches 18ª and 18ᶜ and the fan line 101 to the power line 92.

The switches 18ᵇ and 18ᵈ close gaps in the power line 92 which connects to one side of the damper motor when the switch 110 is closed.

A humidifier 111 in a line 112, 113, is provided to supply the necessary humidity to the air circulated by the fan 11. There is a pilot light 114 in the humidifier circuit to indicate when the humidifier is operating. A humidostat 115 controls the operation of the humidifier in accordance with the humidity of the air. When the moisture content of the air is less than that required, the humidostat 115 closes the line 112, 113 and then additional moisture is supplied to the air by the humidifier 111. When the moisture content of the air becomes sufficient, the humidostat 115 opens the line 112, 113 and the humidifier becomes inoperative.

Figs. 3, 4, 5, 6 show the various positions of the switches 18ª, 18ᵇ, 18ᶜ, 18ᵈ, and 18ᵉ. Fig. 3 shows the switches 18ª and 18ᶜ closed, at which time the heater circuit 109, 106 is closed. The switch 18ª bridges the gap between terminals 116, 116 and the switch 18ᶜ bridges the gap between terminals 117, 117. In this position of the switches 18ª and 18ᶜ, the heater circuit 109, 106 is closed and artificial heat is supplied by the heater 16. The damper motor circuit is open at this time because the gaps in the lines 92 and 87 and 103 are not closed by the switches 18ᵇ, 18ᵈ and 18ᵉ.

The heater 16 will continue to supply artificial heat until the temperature reaches a predetermined degree, 97° in this case, when the thermostat 18, due to the column of mercury reaching the contact 63, will act to de-energize the solenoid 99. The switch 18ª will move away from the terminals 116, 116, resulting in breaking the heating element circuit. When this occurs the switch 18ª will move to the position shown in Fig. 5, which shows the switches 18ᵈ and 18ᵉ open. In this position the switch 18ᵇ will bridge the gap between terminals 118, 118, in the power line 92. At this time both the heater circuit 109 and the damper motor circuit are open. Consequently no artificial heat is being supplied and no outside air is being admitted and no inside air is being discharged.

The switches 18ª, 18ᵇ, 18ᶜ, 18ᵈ, 18ᵉ will remain in the position indicated in Fig. 5 until the temperature rises to a predetermined degree or drops to a predetermined degree. If the temperature drops to a predetermined degree, 97° F. minus, or about 96.9° F., in this case, the thermostat 18, because the column of mercury opens the circuit at contact 63, will act to cause the switch 18ª to engage the terminals 116, 116, when it will again occupy the position illustrated in Fig. 3 and close the heating element circuit. Artificial heat will be again supplied as before described until the temperature rises sufficiently to cause the thermostat 18 to open the switch 18ª.

With the switches in the positions illustrated in Fig. 5, if the temperature rises sufficiently to cause the column of mercury in the thermostat to rise sufficiently to reach the contact 62 which is located at 97.5° F. in this case, the thermostat will act to de-energize the solenoid 90. This will result in the switch 18ᶜ moving away from the terminals 117, 117 and breaking the heater circuit, at this point also. With all the switches operating correctly, the heater circuit has already been broken by solenoid 99 at terminals 116, 116, so that electrically no change occurs in the heater circuit due to this opening of contacts 117, 117. However, in case solenoid 99 should fail to operate and not open contacts 116, 116, when the mercury column reaches contact 63, the further rise of the column to contact 62 will then act to cause switch 18ᶜ to actually break the heater circuit due to the solenoid 90 being thus de-energized. In this case, the opening of switch 18ᶜ provides a protection against overheating in case of a failure of solenoid 99 or switch 18ª. At the same time the switch 18ᵈ engages terminals 119, 119, in the line 92, and closes the circuit to the damper motor 35, and switch 18ᵉ closes the interlock circuit, 87, 103. The switches then are in the positions illustrated in Fig. 4, at which time the circuit for the damper motor 35 is closed and the circuit for the heater 16 is open. This motor then rotates and opens the inlet damper 20 and the outlet damper 24, so that outside air will be admitted and inside air discharged. While means is shown for admitting cooling air to lower the temperature, any cooling medium or cooling mechanism may be used.

After the damper motor circuit is closed, and as long as the heater circuit is open, the temperature is controlled wholly by admitting and discharging air, the thermostat 18 at this time controlling the position of the switch 18ᵇ to make and break the damper motor circuit. At this time the switch 18ᵈ engages the terminals 119, 119 and the switch 18ᵉ engages the terminals 120, 120 of the interlock circuit. The switch 18ᵇ is alternately moved to open and close the damper motor circuit. Fig. 6 shows the damper motor circuit open, the switch 18ᵇ having been moved away from the terminals 118, 118. Both the damper motor circuit and the heater circuit are open at that time, when no artificial heat is supplied and no outside air admitted.

After the damper motor circuit is closed, due to the heat rising to 97.5° F., outside air is admitted and inside air is discharged. This continues until the temperature is reduced to 96.9° F., when the thermostat acts to open the damper motor circuit by moving switch 18ᵇ away from the terminals 118, 118, as illustrated in Fig. 6, which stops the damper motor 35, whereupon the weight 27 will close the dampers, 20, 24. Should the temperature then rise to 97° F., the thermostat 18 will act and cause the switch 18ᵇ to engage the terminals 118, 118, thus again closing the damper motor circuit so that the damper motor will open the dampers 20 and 24 to admit outside air and discharge inside air. This continues until the temperature drops to 96.9° F., when the damper motor circuit is again opened through the thermostat 18. This alternate opening and closing of the damper motor circuit continues until, for some reason, such as the removal of a number of eggs from the incubator at the end of the period of incubation, or the removal of chicks from the hatcher, or a drop in the temperature surrounding the incubator or hatcher, the temperature drops to 96.5° F., the point at which the contact 64 is fixed. If this occurs, the thermostat 18 will act to cause the switch 18ᶜ to engage the terminals 117, 117 in the heater circuit. As the switch 18ª was moved into contact with the terminals 116, 116 at 96.9° F., the movement of the switch 18ᶜ into engagement with the terminals 117, 117, results in closing of the heater circuit, after which the temperature will be controlled wholly by supplying artificial heat until the temperature rises to 97° F., when the switch 18ª will be moved away from the terminals 116, to break the heater circuit. If the temperature drops to 96.9° F., the switch 18ª is again moved into contact with the terminals 116 to close the heater circuit, where it remains until the temperature rises to 97° F., when the heater circuit is opened.

The operating temperature range selected for illustration for both the supply of artificial heat and the admission of outside air and the discharge of inside air is 96.9° F. to 97° F. The temperature selected for purposes of illustration for changing from the supply of artificial heat to the admission of outside air and the discharge of inside air is 97.5° F., while that for changing from the admission of outside air and the discharge of inside air to the supply of artificial heat is 96.5° F.

After the temperature rises to 97.5° F., the temperature is controlled wholly by admitting outside and discharging inside air when it is necessary to reduce the temperature, and by cutting off this admission and discharge of air at the proper temperature. This continues until the temperature drops to 96.5° F., at which the control will be by supplying and cutting off the supply of artificial heat.

After the temperature has dropped to 96.5° F., the temperature is controlled entirely by supplying artificial heat and cutting off the supply of artificial heat. This continues until the temperature rises to 97.5° F. when the temperature control is again through the admission of outside air and the discharge of inside air and cutting off this admission and discharge.

Figure 11 is a diagram showing the operation of the temperature control during a representative hatching cycle. The diagram shows that during operation of the heater, the switches are in the positions indicated in Fig. 3, when the mercury column has separated from contact 63 at a temperature slightly below 97, shown as 96.9° F. During the increase in temperature from 96.9 to 97°, due to the supplying of artificial heat, the damper motor circuit is open. When the mercury column reaches contact 63, at 97° F., the switches change to the position indicated in Fig. 5, when the heater and damper motor circuits are both open, and no artificial heat is supplied, and no air is being admitted or discharged. At this time the switch 18ᵇ engages the terminals 118, 118 in the damper motor circuit and the switch 18ᶜ engages the terminals 117, 117 in the heater circuit. During operation of the cooling mechanism, in this case the dampers, the switches are in the positions indicated in Fig. 4 when the mercury column has reached contact 62 at 97.5° F. and has thereby initiated the cooling cycle, no artificial heat being supplied, but cooling air being admitted and inside air discharged through dampers 20 and 24. When the temperature has dropped to 96.9° F., the switches are in the positions indicated in Fig. 6, when both the heater circuit and damper motor circuit are open and no artificial heat is being supplied nor air being admitted or discharged. At this time switch 18ª engages the terminals 116, 116 in the heater circuit and the switch 18ᵈ engages the terminal 119, 119 in the damper motor circuit, while the switch 18ᵉ engages the terminals 120, 120 in the interlock circuit. Upon increase of the temperature to 97° F. the mercury column reaches contact 63, and the switches again take the positions indicated in Fig. 4, thus causing dampers 20 and 24 to open.

Diagrammatic Fig. 11 also shows that the thermostat 18 is fixed to open the switch 18ª at 97° F., by moving it away from the terminals 116, 116 in the heater circuit, and to close it at appoximately 96.9° F. Fig. 11 also shows that the thermostat 18 is fixed to move the switch 18ᶜ away from the terminals 117, 117, in the heater circuit and the switch 18ᵈ into engagement with the terminals 119, 119 in the damper motor circuit and the switch 18ᵉ into engagement with the terminals 120, 120 in the interlock circuit, at 97.5° F., so as to close the damper motor circuit. From that time on the temperature is controlled by opening at 97° F., and closing at 96.9° F., the dampers 20 and 24. This continues until the temperature drops to 96.5° F., when the temperature is controlled by opening and closing the heater circuit, the opening occurring at 97° F., and closing at 96.9° F.

After the temperature reaches 97.5° F. the temperature is controlled by opening dampers to admit cooling air and discharge inside air and by closing these dampers to cut off this admission and discharge of air. No heat is supplied at this time. After the temperature drops to 96.5° F., the temperature is controlled by supplying artificial heat and cutting off this heat until the temperature rises to 97.5° F., when the temperature is again controlled by opening and closing the dampers 20, 24.

When eggs are placed in the hatcher, the temperature drops and artificial heat is supplied until the temperature reaches 97° F., when it is cut off. When the temperature drops to 96.9° F., artificial heat is again supplied. During this interval, the structure is closed and no outside air is admitted. When the eggs are removed from the incubator to the hatcher, they are cooled by the outside air and the temperature in the hatcher is reduced due to the opening of the hatcher door. When chicks which have hatched are removed from the hatcher, the temperature in the hatcher is reduced, for which reason it is necessary to supply artificial heat in the hatcher also. Artificial heat is also required in the hatcher for preheating the empty machine before eggs are placed therein, and for maintaining the proper temperature when the number of eggs transferred thereto is small or the room temperature is abnormally low. The temperature is controlled in the hatcher by the same kind of means used for that purpose in the incubator.

When the temperature rises to 97.5° F., the control is through the admission and discharge of air. This continues until the temperature drops to 96.9° F., when the admission and discharge of air is discontinued until the temperature rises to 97° F. when air is again admitted and discharged.

As above described, the switch blades 93 and 93ª are connected to opposite sides of the electric power source. In the following detailed description of the circuits illustrated in Figures 3, 4, 5 and 6, these circuits will be traced from one switch blade, as 93ª, to the other switch blade, as 93, because the details of connection of one switch blade to one side of the power source, and of the other switch blade to the other side of the power source are of no importance to the operation of the switches of the relay and their control by the thermostat 18.

In order to simplify and clarify the description of the circuits illustrated in these figures, the thermostat contact 62 will be considered as directly connected to resistor 88 and also wire 87; the contact 63 will be considered as directly connected to the resistor 96; the contact 64 will be considered as connected directly to wire 103; and the contact 65 will be considered as directly connected to the wire 104.

In Figure 3, the parts are shown in the position taken when the temperature is below 96.5 degrees F., wherein the mercury of thermostat 18 will be below the contact 64. A circuit will then extend from switch blade 93ª to wire 101, through wire 100, through solenoid 99, thence through condenser 98 to switch blade 93; likewise, a second circuit in parallel with this circuit will extend from wire 100, solenoid 90 and condenser 94 to switch blade 93. The solenoids 99 and 90 will be fully energized to engage switch 18ª with contacts 116 and switch 18ᶜ with contacts 117, respectively. This will complete a circuit extending from switch blade 93ª through a portion of wire 101, 116, 18ª, 116, 117, 18ᶜ, 117, wire 109, heating element 16 (also line 107' and pilot light 107 in parallel with element 16), wire 106 to switch blade 93. Due to the mercury level of thermostat 18, the contact 65 is isolated from each of contacts 62, 63 and 64. The heater 16 is then operative, the damper motor 35 is inoperative and the fan 11 is operative.

Until the temperature has risen (due to operation of the heater) to a value above 97 degrees F. and below 97.5 degrees F., the position of Figure 3 will be maintained due to the fact that, when the mercury, in rising, engages contact 64, current can then flow no further through wire 103 than 120 due to the upward position of switch 18ᵉ and the solenoid 90 cannot then be weakened by shunting for that reason. Thus, when the temperature has risen above 97 degrees F., the mercury completes a circuit between contacts 65 and 63 to bring the parts to the position shown in Figure 5.

As shown in Figure 5, completion, by the thermostat mercury, of a circuit between contacts 65 and 63, causes resistor 96 to operate as a portion of a shunt to weaken the solenoid 99 and permit the switch 18ª to be removed from contacts 116, 116. A circuit then extends from switch blade 93ª through wires 101, 104, contact 65, the mercury, contact 63, resistor 96, condenser 98 to switch blade 93. Due to the fact that the resistance value of solenoid 99 is much greater than that of resistor 96, a much weaker circuit extends from wire 101 through solenoid 99 to condenser 98 and thence to switch blade 93, which weaker circuit is in parallel with the above described circuit including the resistor 96. A circuit also extends from switch blade 93ª through a portion of wire 101 and wire 100, through solenoid 90, condenser 94 and thence to switch blade 93. This circuit is of sufficient strength to fully energize solenoid 90 to maintain switch 18ᶜ in engagement with contacts 117, 117. Due to the position taken by switches 18ᵃ and 18ᶜ, the energizing circuit for the heating element 16, which was complete in Figure 3, is now open and the heater is off, and likewise, the damper motor 35 is also off, because of the position of the switch 18ᵈ away from contacts 119. Therefore, in the position of Figure 5, the fan is "on" and both the heater element 16 and damper motor 35 are de-energized or "off."

The above described circuits of Figures 3 and 5 are operative when the incubator, and/or hatcher, is operating on heat control. When sufficient heat is generated in the eggs to raise the temperature above 97.5 degrees F., the parts will take the position shown in Figure 4 to accomplish a change-over, in the incubator and/or hatcher, from heat control to air control.

In Figure 4, a circuit extends from switch blade 93ᵃ, through wire 101, wire 104, to contact 65 and thence, in one direction, through contact 63, resistor 96, and condenser 98, to switch blade 93, and, in the other direction, from contact 65, through contact 62, resistor 88, condenser 94 to switch blade 93. These circuits operate as shunting circuits to weaken energization of solenoids 99 and 90, which energization is accomplished by circuit branches extending from wire 101 of the above circuit, through wire 100, through solenoid 99 to condenser 98 and thence to switch blade 93, and from wire 100 through solenoid 90 to condenser 94 and thence to switch blade 93. At the same time, the mercury will complete a branch circuit between contact 65 and contact 64, which extends from contact 64 through wire 103 to contact 120, through switch 18ᵉ, contact 120 and wire 87 to resistor 88. The solenoids 99 and 90 will be so far weakened as to permit withdrawal of switch 18ᵃ from contacts 116, 116, and switch 18ᶜ from contacts 117, 117, and permit engagement of switch 18ᵇ with contacts 118, 118 and engagement of switch 18ᵈ with contacts 119, 119, as well as engagement of switch 18ᵉ with contacts 120, 120, to complete the above-described branch circuit from contact 65 through contact 64 and switch blade 18ᵉ to resistor 88.

The position of the switches is such as to maintain the heater energizing circuit open, while at the same time closing the damper motor energizing circuit, which circuit extends as follows: switch blade 93ᵃ, 118, 119, 18ᵈ, 119, 110, damper motor 35 to switch blade 93. In this position of parts, the fan is operative, the heating element 16 is de-energized and the damper motor 35 is operative. This position of parts is maintained until the temperature, due to introduction of cool air, has dropped to a value above 96.5 degrees F. and below 97 degrees F. When the mercury is falling, prevention of restoration of the full energization of solenoid 90 upon disengagement of the mercury from contact 62 is prevented by the above described branch circuit extending from contact 64, wire 103, contact 120, switch 18ᵉ, contact 120, and wire 87 to resistor 88.

In other words, when the mercury has dropped below the contact 62, but is yet above contact 63, the shunting circuit from contact 65, contact 64, wire 103, 120, 18ᵉ, 120, 87, resistor 88, condenser 94 to switch blade 93 takes the place of the circuit from contact 65, through the mercury, contact 63, resistor 88, condenser 94 to switch blade 93. Thus, the de-energization of the solenoid 90 is maintained to prevent it from operating to withdraw switch 18ᵈ from contacts 119, 119, and switch 18ᵉ from contacts 120, 120 until the temperature has fallen sufficiently to cause restoration of the full energization of solenoid 99, when the mercury takes the position of Figure 6, where the temperature is at a value above 96.5 degrees F. and below 97 degrees F.

In the position of Figure 6, the solenoid 99 becomes sufficiently energized when the mercury falls below the contact 63. In that position of parts, a circuit extends from switch blade 93ᵃ through wire 101, a portion of wire 100, solenoid 99 and condenser 98 to switch blade 93 to fully energize solenoid 99 and withdraw switch blade 18ᵇ from engagement with contacts 118, 118.

A circuit for shunting and maintaining the solenoid 90 weakened extends from switch blade 93ᵃ, through wire 101, wire 104, contact 65, the mercury, contact 64, wire 103, contact 120, switch 18ᵉ, contact 120, wire 87, resistor 88, and condenser 94, to switch blade 93. A weak circuit extends from wire 100, solenoid 90, condenser 94, to switch blade 93. The solenoid 90 is thus maintained sufficiently weak to retain its switch in the position of Figure 4, so that the switch 18ᵉ engages contacts 120. The position of the switches is then such as to maintain the heater energizing circuit and the damper motor energizing circuit open so that the heater 16 and damper motor 35 are de-energized or inoperative and the fan is maintained operative.

The relays 90 and 99 may be of the resonant circuit type which can be controlled with a small current through the thermostat. The coils, in such a relay, receive their current through a condenser, the capacity of which is of proper value to form a resonant circuit when connected in series with the coil (inductance) of the relay. Control will be accomplished by shunting the coils 90 and/or 99 with resistances 88 and/or 96 of proper value to destroy the resonance of the circuit through the coils 90 and/or 99 to achieve the same manner of operation as is described above.

The operation of the fan 11 is undisturbed by the operation of the switches through the thermostat 18 and at any time the damper motor may be de-energized by manually opening the switch 110.

Likewise, the connection of the humidifier 111, through manual switch 115 and wire 113 with the switch blade 93ᵃ and through wire 112 with the switch blade 93, permits of this operation selectively, totally independently of the thermostat 18.

The supply of artificial heat and the admission of outside air and discharge of inside air are controlled the same in the incubator as in the hatcher.

The method of incubating and hatching eggs will be understood from the foregoing description, one means for practicing which is illustrated in the accompanying drawings. The eggs are placed in the incubator, artificial heat is supplied when needed, cooling air is admitted and hot air discharged when the temperature in the incubator is too high, the eggs are transferred from the incubator to the hatcher after they develop heat, and the supply of artificial heat and admission and the discharge of air is controlled thermostatically. While the means for practicing the method utilizes cooling air for reducing the temperature, any means may be employed which will lower the temperature to the desired degree.

My invention also embodies the method of controlling the temperature by supplying artificial heat when needed, admitting outside air and discharging inside air when necessary, and controlling the supplying of artificial heat and admission and discharge of air by a single thermostat.

My invention also embodies the method of controlling the supplying of artificial heat and the admission and discharge of air in an incubator and a hatcher by a single thermostat in each.

The thermostat 18 is removably mounted in a support attached to a removable portion of the incubator or hatcher. A bracket 121, having a vertical plate like member 121ª, with two horizontal projections 121ᵇ, and 121ᶜ, is attached, by a portion 121ᵈ, to a removable portion 122, such as an instrument board, of the incubator and hatcher (Figs. 8 and 20). This bracket supports a casing consisting of two parts 123, and 124, secured together by screws or rivets 125, the casing being secured to the bracket 121 by screws such as that shown at 126. A cup 127, secured in the casing 121 by a screw 128, holds a rubber or other yielding seat 129 for the thermostat 18. Near the upper end of the thermostat 18 is a clamp 130 pivoted at 131 to a plate 132 projecting from the vertical portion 121ª of the bracket 121. This plate has a semi-circular opening 133, which, with the inner wall 134 of the clamp 130, forms a circular opening to receive a rubber or yielding sleeve 135 with an opening 136 therein through which passes the upper portion of the thermostat 18.

The leads 79, 80, 81, 82 have terminals 137, 138, 139, 140, respectively, which are inserted into sockets to connect the thermostat to the windings 90 and 99 and to the interlock circuit 103 and the line 92.

The thermostat 18 can be removed from the incubator or hatcher by removing the parts 123, 124, swinging the clamp 130 on its pivot to release the rubber sleeve 135 and disconnecting the leads 66, 67, 68, 69 from the plate 78. The thermostat is then free to be lifted out of the resilient seat 129.

The use of a single thermostat permanently set at the factory for certain temperatures, greatly simplifies the control of the temperature in the enclosure. Regulation of the thermostat by the operator to keep the controls in the proper relation is eliminated. With the previous system it required from one to four hours to make the necessary adjustments of the thermostats before setting eggs. The new thermostat is factory calibrated, and all the operator has to do to place the apparatus in full operation is to close the main switch. This thermostat could be provided with adjustable contacts if occasion should require an adjustable thermostat to meet the requirements of different locations or different operating conditions.

When the thermostat is permanently set at the factory, the danger of failure in hatching, due to improper adjustments by inexperienced operators, is eliminated.

The use of a single thermostat also eliminates the possibility of crossing the controls, which is done sometimes when two thermostats are employed for the same structure, due to stratification of the air causing a momentary difference in temperature at two control points.

The single thermostat is more sensitive and results in a more accurate control of the temperature. This results in a greater conservation of moisture and the saving of power because it is not necessary to admit cooling air for as long periods as before. This reduces the time during which artificial heat must be supplied and also the time during which the damper motor must be operated.

It will be understood that it is desired to comprehend within this invention such modifications as come within the scope of my claims and my invention.

It will also be understood that the incubator and hatcher will have independent thermostatic controls so that different ranges of temperautre can be maintained in the incubator and hatcher if desired. In the case of combination machines, where incubating and hatching are both carried out in one structure, one thermostatic control would suffice for both incubating and hatching.

While the invention has been illustrated and described with reference to an incubator and hatcher, it is to be understood that it involves a control system for maintaining a uniform condition and in which an element, movable in response to changes in condition, selects a device for effecting the condition in opposite extreme positions and controls the application of the selected device in an intermediate position. Although more specifically adapted for temperature regulation, it is clear that the control is applicable as well to maintaining other uniform conditions. While electric circuits provide a simple means for applying the control, it is to be understood that the invention comprehends other means to select and apply the condition-effecting devices.

Having thus fully described my invention, what I claim as new and desire to secure by Letters Patent, is:

1. In a temperature regulator for an enclosed structure adapted to be affected by animal heat generated therein, a source of artificial heat, a source of cooling air, a single thermostat operable within a given range of temperature to independently control either the artificial heat or the air and operable over a greater range of temperature to transfer the control of said thermostat from heat to air and vice versa.

2. In a temperature regulator for an enclosed structure, a source of artificial heat, a source of fresh air, a single thermostat operable within a given range of temperature to independently control either the artificial heat or the air, said thermostat being operable at a higher temperature to transfer the control of said thermostat from the heat to the air and operable at a lower temperature to transfer the control of said thermostat from the air to the heat.

3. In a temperature regulator for an enclosed structure, artificial heating means, means to cut in and cut out the artificial heating means to maintain a given range of temperature in the structure, means to admit outside cold air to reduce the animal heat therein when that heat rises above the point at which the artificial means is cut out and maintain the temperature within said range, a single thermostat adapted to select either heating or cold air control of said temperature and to control the application of whichever is selected so as to maintain the temperature within said range, and means for causing the circulation of air within said structure when said artificial heating means is in operation and when outside cooling air is being admitted.

4. In a temperature regulator for an enclosed structure, a source of artificial heat, cooling means, means for applying and cutting off the source of artificial heat and the cooling means, an electrical circuit for the means for applying and cutting off the source of artificial heat, an electrical circuit for the means for applying and cutting off the cooling means, a thermostat responsive to the temperature within the enclosure and having a moving element adapted to cause the opening and closing of either of said first-mentioned or said second-mentioned circuits in the same predetermined temperature range and adapted at extreme temperatures beyond said range to select the circuit to be controlled in said range.

5. In a temperature regulator for an enclosed structure, a source of artificial heat, a source of cooling air, means for applying and cutting off the source of artificial heat and the source of cooling air, an electric circuit for said means for applying and cutting off the source of artificial heat, an electric circuit for the means for applying and cutting off the source of cooling air, and a thermostat responsive to the temperature within the enclosure and having a moving element adapted to cause the opening of the first named circuit when said temperature rises to a predetermined degree, to cause the closing of said first named circuit when said temperature drops to a predetermined degree, to close the circuit for the source of cooling air when said temperature rises to a predetermined degree and thereafter cause the opening and closing of the circuit for the source of cooling air within the same range in which the source of artificial heat is controlled.

6. In a control system, an element movable in response to a condition to be controlled, oppositely acting devices for affecting said condition, spaced elements cooperating with said first-mentioned element in its opposite extreme positions for selecting the proper device to control said condition, and at least one intermediate element cooperating with said first-mentioned element in an intermediate position to control the application of said selected device.

7. In a control system, an element movable in response to a condition to be controlled, oppositely acting devices for affecting said condition, at least one element adapted to cooperate with said movable element to independently control either of said devices, an element located on one side of said at least one element and cooperating with said movable element to select one of said devices to be controlled by said at least one element, and an element located on the opposite side of said at least one element and cooperating with said movable element to select the other of said devices to be controlled by said at least one element.

8. In a control system, an element movable in response to a condition to be controlled, a plurality of elements adapted to be successively engaged thereby, and a plurality of devices adapted to restore said condition, said devices having an opposite effect on said condition, certain of said plurality of elements selecting, in response to movement of said first-mentioned element, the proper device to control said condition and at least one of said plurality of elements being located intermediate said certain elements controlling the application of the selected device in response to movement of said first-mentioned element.

9. In a control system, an element movable in response to a condition to be controlled, and at least three elements adapted to be successively engaged by said first-mentioned element, oppositely acting devices for affecting said condition, the extreme elements of said at least three elements selecting the device to be operated to restore said condition and at least one intermediate element of said at least three elements controlling the operation of said selected device.

10. In a thermostatic control system, an element movable in response to change in temperature, heating means and cooling means adapted to be independently applied to secure a desired temperature condition, an element cooperating with said movable element in a high temperature position thereof to select said cooling means for operation, an element cooperating with said movable element in a low temperature position thereof to select said heating means for operation, and at least one intermediate element cooperating with said movable element in an intermediate temperature position to control the application of the selected means.

11. In a thermostatic control system, an element movable in response to change in temperature, heating means and cooling means adapted to be independently applied to secure a desired temperature condition, and at least three elements adapted to be successively engaged by said first-mentioned element, an extreme element of said at least three elements selecting the cooling means for operation, the opposite extreme element of said at least three elements selecting the heating means for operation, and at least one intermediate element of said at least three elements controlling the application of the selected means.

12. In a thermostatic control system, a contact element movable in response to change in temperature, heating means and cooling means adapted to be independently applied to secure a desired temperature condition, a contact cooperating with said movable element in a high temperature position to select said cooling means for operation, a contact cooperating with said movable element in a low temperature position to select said heating means for operation, and at least one intermediate contact cooperating with said movable element in an intermediate temperature position to control the application of the selected means.

13. In a thermostatic control system, a contact element movable in response to change in temperature, at least three contacts adapted to be successively engaged by said contact element, electric circuits for said contacts and contact element, heating means and cooling means controlled by said circuits, one extreme contact selecting the cooling means for operation, the opposite extreme contact selecting the heating means for operation, and at least one intermediate contact of said contacts controlling the application of the means selected by the extreme contacts.

14. In a thermostatic control system, a contact element movable in opposite directions in response to increase and decrease in temperature, at least three contacts adapted to be progressively engaged by said element in movement in one direction and to be progressively disengaged from said element in movement in the opposite direction, circuits for said contacts and element, heating means and cooling means controlled by said circuits, the last engaged contact in movement of said element in said one direction selecting one of said means for operation, the last disengaged contact in movement of said element in the opposite direction selecting the other means for operation, and at least one intermediate contact engaged and disengaged by said element to control the application of the selected means to secure the desired temperature condition.

15. In a thermostatic control system, a contact element movable in opposite directions in response to increase and decrease in temperature, at least three contacts progressively engaged and disengaged by said element in movement in opposite directions, circuits for said contacts and element, and heating means and cooling means controlled by said circuits, at least one intermediate contact of said contacts cooperating with the movable element to independently control either the heating or cooling means, and other of said contacts being engaged and disengaged at higher and lower temperatures by said element to transfer the control from one of said means to the other as required by the temperature condition of the medium acted upon.

16. In a thermostatic control system, a mercury column expansible and contractible upon increase and decrease in temperature, a plurality of spaced terminals adapted to contact with said column in different positions thereof, circuits connected to said terminals, and heating and cooling means controlled by said circuits, the lowest of said terminals connecting said column in the circuits, the next higher terminal constituting a lower change-over point and serving to select said heating means for operation when disengaged by said column, the uppermost of said terminals constituting an upper change-over point and serving to select said cooling means for operation when engaged by said column and at least one of said terminals located intermediate said points adjacent the temperature point to be maintained and controlling the application of the means selected.

17. In a thermostatic control system, a contact element movable in opposite directions in response to increase and decrease in temperature, a plurality of contacts progressively engaged and disengaged by movement of said element in opposite directions, heating means, cooling means, and two double throw relays for controlling said means, the relay terminals in one direction being serial connected with one of said means and in the opposite direction with the other of said means, said element cooperating with the extreme contacts to cause movement of one of said relays in opposite directions to select the means to be applied, said element cooperating with at least one intermediate contact to cause movement of the other relay in opposite directions to control the application of the selected means.

18. In a thermostatic control system, a contact element movable in opposite directions in response to increase and decrease in temperature, at least three contacts progressively engaged and disengaged by movement of said element in opposite directions, a power circuit, heating means, cooling means, a pair of double throw relays having their contacts in one direction connected in series with one of said means and the power circuit and their contacts in the reverse direction connected in series with the other of said means and the power circuit, operating coils for said relays, means connecting one end of said coils together and to one side of a control circuit, the opposite ends of said coils being connected through condensers to the opposite side of said control circuit, means connecting said joined end of said coils to said element, and an interlock switch closed when one of said relays is de-energized, the first of said contacts being connected to one side of said interlock, the second of said contacts being connected through a resistor to the opposite end of the coil of the other of said relays, the third of said contacts being connected to the other side of said interlock and through a resistor to the opposite end of said one relay, said resistors being of a value to by-pass the coils sufficiently to de-energize the relays.

19. In a temperature regulator for an enclosed structure, an electric heater, a source of cooling air including a damper, a motor for operating said damper, independent electric circuits for said heater and said motor, and a thermostat operable within a predetermined range of temperature to independently select and control either of said circuits and operable at certain temperatures to select and control the circuit to be employed to maintain the temperature within said range.

20. In a temperature regulator for an enclosed structure, a source of heat, a source of cooling air, means for applying and cutting off the source of heat, means for applying and cutting off the source of cooling air, an electrical circuit for each of said means, means for opening and closing said circuits, a single thermostatic means for selecting the proper circuit to be controlled for control of the temperature within said structure and for controlling independently whichever circuit is selected in accordance with the temperature within the structure within the same identical temperature limits, and electrical interlock means adapted to maintain air control of said temperature once air control is established even though said temperature drops to a point where normally heat control would be restored.

21. In a temperature regulator for an enclosed structure, a source of heat, a source of cooling air, means for applying and cutting off the source of heat, means for applying and cutting off the source of cooling air, an electrical circuit for each of said means, means for opening and closing said circuits, a single thermostatic means for selecting the proper circuit to be controlled and for controlling independently whichever circuit is selected, with the temperature within the structure within the same identical temperature limits, and electrical interlock means adapted to allow said temperature to be controlled by said cooling air within the same limits as by said heat.

22. In a temperature regulator for an enclosure adapted to be affected by natural heat generated therein, a source of artificial heat, a source of cooling air, and means adapted to maintain the temperature within said enclosure within predetermined limits comprising a single thermostat responsive to said temperature, two relays which when subjected to an electric current cause said heat to be applied, a control adapted to be engaged by said thermostat at the upper of said limits to so actuate one of said relays as to cause said heat to be cut off, and a second contact beyond said first contact adapted to be engaged by said thermostat at a higher predetermined temperature to so actuate the other of said relays as to cause said cooling air to be applied.

23. In a temperature regulator for an enclosure adapted to be affected by natural heat generated therein, a source of artificial heat, a source of cooling air, and means adapted to maintain the temperature within said enclosure within predetermined limits comprising a single thermostat responsive to said temperature, two relays which when subjected to an electric current cause said heat to be applied, a contact adapted to be engaged by said thermostat at the upper of said limits to so actuate one of said relays as to cause said heat to be cut off, a second contact beyond said first contact adapted to be engaged by said thermostat at a higher predetermined temperature to so actuate the other of said relays as to cause said cooling air to be applied, a third contact ahead of said two contacts adapted to be engaged by said thermostat at a lower predetermined temperature, and an interlock circuit established thereby and by said second relay and adapted to maintain said second relay in the relationship in which it is actuated by the engagement of said thermostat with said second contact, whereby said cooling air is applied and controlled to maintain said temperature within said limits and the heat control is restored when said temperature drops to such an extent as to cause said third contact to be disengaged by said thermostat.

CARL A. SCHAEFER.